United States Patent [19]

Lockhart

[11] Patent Number: 4,499,229

[45] Date of Patent: Feb. 12, 1985

[54] ONE PACKAGE, STABLE, MOISTURE CURABLE, ALKOXY-TERMINATED ORGANOPOLYSILOXANE COMPOSITIONS

[75] Inventor: Thomas P. Lockhart, Schenectady, N.Y.

[73] Assignee: General Electric Company, Schenectady, N.Y.

[21] Appl. No.: 481,527

[22] Filed: Apr. 1, 1983

[51] Int. Cl.³ .................. C08K 3/34; C08G 77/04; C08G 77/26

[52] U.S. Cl. .................. 524/450; 524/173; 524/588; 524/730; 524/863; 528/10; 528/18; 528/19; 528/24; 528/29; 528/32; 528/34; 528/901

[58] Field of Search .......... 528/18, 19, 24, 29, 528/32, 34; 524/588, 173, 863, 450, 730

[56] References Cited

U.S. PATENT DOCUMENTS

| | | | |
|---|---|---|---|
| 2,607,792 | 8/1952 | Warrick | 556/459 |
| 3,035,016 | 5/1962 | Bruner | 528/34 |
| 3,065,194 | 11/1962 | Nitzsche et al. | 524/788 |
| 3,070,559 | 12/1962 | Nitzsche et al. | 523/211 |
| 3,122,522 | 2/1964 | Brown et al. | 528/31 |
| 3,127,363 | 3/1964 | Nitzsche et al. | 424/78 |
| 3,133,891 | 5/1964 | Ceyzeriat | 528/18 |
| 3,153,007 | 10/1964 | Boot | 528/14 |
| 3,161,614 | 12/1964 | Brown | 528/36 |
| 3,184,427 | 5/1965 | Russell et al. | 524/773 |
| 3,240,731 | 3/1966 | Nitzsche et al. | 524/863 |
| 3,296,161 | 1/1967 | Kulpa | 528/34 |
| 3,296,195 | 1/1967 | Goossens | 528/34 |
| 3,334,067 | 8/1967 | Weyenberg | 528/17 |
| 3,438,930 | 4/1969 | Beers | 524/786 |
| 3,518,286 | 6/1970 | Pande et al. | 260/429.7 |
| 3,542,901 | 11/1970 | Cooper et al. | 528/33 |
| 3,632,557 | 6/1972 | Brode et al. | 528/28 |
| 3,647,917 | 3/1972 | Schulz et al. | 528/33 |
| 3,677,996 | 7/1972 | Kaiser et al. | 528/20 |
| 3,689,454 | 9/1972 | Smith et al. | 528/17 |
| 3,779,986 | 12/1973 | Smith et al. | 528/17 |
| 3,819,563 | 6/1974 | Takago et al. | 524/449 |
| 3,886,118 | 5/1975 | Nitzsche et al. | 528/18 |
| 3,974,120 | 8/1976 | Razzano et al. | 528/23 |
| 4,035,355 | 7/1977 | Baney et al. | 528/32 |
| 4,180,642 | 12/1979 | Takago | 528/32 |
| 4,223,122 | 9/1980 | Cella | 528/30 |
| 4,248,993 | 2/1981 | Takago | 528/38 |
| 4,257,932 | 3/1981 | Beers | 524/588 |
| 4,257,957 | 3/1981 | Cella | 549/214 |
| 4,294,975 | 10/1981 | Takago | 556/482 |
| 4,301,269 | 11/1981 | Hashimoto et al. | 528/34 |
| 4,302,571 | 11/1981 | Arai et al. | 528/32 |
| 4,304,920 | 12/1981 | Arai et al. | 556/440 |
| 4,323,488 | 4/1982 | Takago et al. | 528/32 |
| 4,339,563 | 7/1982 | Takago et al. | 528/14 |
| 4,357,443 | 11/1982 | White et al. | 528/34 |

OTHER PUBLICATIONS

Reagents for Organic Synthesis, Fieser et al., J. Wiley, NY, 1967, pp. 703–705, vol. 1.
Advanced Organic Chemistry, 2nd Ed., J. March, McGraw-Hill, 1977, pp. 1184, 923–925, 936–937 & 940.
Chemistry & Technology of Silicones, W. Noll, Academic Press, 1968, pp. 99–100.
Chemistry and Technology of Silicones, W. Noll, Academic Press, New York, 1968, p. 397.
Encyclopedia of Chemical Technology, Kirk-Othmer, 3rd Ed., vol. 13, John Wiley & Sons, New York, pp. 874–893.

*Primary Examiner*—Herbert J. Lilling
*Attorney, Agent, or Firm*—William A. Teoli; James C. Davis, Jr.; James Magee, Jr.

[57] ABSTRACT

Stable, substantially acid-free, one-package moisture curable alkoxy terminated organopolysiloxane compositions are provided. These room temperature vulcanizable alkoxy terminated organopolysiloxane compositions use a condensation catalyst, a stabilizer, or scavenger for materials having chemically combined hydroxy radicals and diorganosulfoxide, such as dimethylsulfoxide which functions as a cure rate accelerator.

7 Claims, No Drawings

ONE PACKAGE, STABLE, MOISTURE CURABLE, ALKOXY-TERMINATED ORGANOPOLYSILOXANE COMPOSITIONS

CROSS REFERENCE TO RELATED APPLICATIONS

Reference is made to copending application of John E. Hallgren, Ser. No. 277,525, now U.S. Pat. No. 4,377,706, for Polyalkoxysilylenolethers and method for making, White et al, Ser. No. 277,524, now U.S. Pat. No. 4,395,526, for One Package, Stable, Moisture Curable, Polyalkoxy-Terminated Organopolysiloxane Compositions and Method for Making, filed concurrently on June 26, 1981, and John J. Dziark, for Scavengers for One Component Alkoxy Functional RTV Compositions and Process, Ser. No. 349,695, now U.S. Pat. No. 4,417,042, filed Feb. 17, 1982 and Ser. No. 476,000, Swiger et al, for Scavengers for One Component Compositions, filed on or about Mar. 18, 1983, where all of these applications are incorporated herein by reference and assigned to the same assignee as the present invention.

Reference is also made to the copending application of Mary Ann White et al, Ser. No. 481,524, now U.S. Pat. No. 4,472,551 and my copending applications Ser. No. 481,529, Ser. No. 481,528, now U.S. Pat. No. 4,477,625, Ser. No. 481,530, for One Package, Stable, Moisture Curable, Alkoxy-Terminated Organopolysiloxane Compositions, and Ser. No. 481,526, now U.S. Pat. No. 4,472,564, for A Method for Making an Enoxy Stabilized Room Temperature Vulcanizable Organopolysiloxane Composition Which Resists Color Change Upon Aging, where all of these applications are filed concurrently herewith, assigned to the same assignee as the present invention and incorporated herein by reference.

BACKGROUND OF THE INVENTION

Prior to the present invention, various one and two-package moisture curable room temperature vulcanizable (RTV) compositions were available based on the use of a silanol-terminated polydiorganosiloxane having the formula,

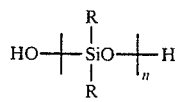

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon.

Ceyzeriat, U.S. Pat. No. 3,133,891 and Bruner, U.S. Pat. No. 3,035,016, are based on the use of methyltriacetoxysilane with a silanol-terminated polydimethylsiloxane under substantially anhydrous conditions. Although the one-package compositions of Bruner or Ceyzeriat, upon exposure to atmospheric moisture, provide satisfactory one-package room temperature vulcanizable organopolysiloxane compositions exhibiting satisfactory tack-free time, for example, 30 minutes or less after an extended shelf period, the acetic acid by-product is corrosive and has a disagreeable odor.

Other variations of one-package acyloxy acid generating RTV's are shown by Kulpa, U.S. Pat. No. 3,296,161, Goossens, U.S. Pat. No. 3,296,195 and Beers, U.S. Pat. No. 3,438,930, assigned to the same assignee as the present invention. Additional one-package acyloxy acid generating RTV compositions are shown by Schulz et al, U.S. Pat. No. 3,647,917 and Nitzsche et al U.S. Pat. No. 3,886,118.

An improved, low odor, substantially non-corrosive one-package RTV composition is shown by Beers, U.S. Pat. No. 4,257,932, assigned to the same assignee as the present invention. Beers achieves a reduction in odor and corrosive properties by utilizing as a cross-linking silane, a less volatile material such as methyltris-(2-ethylhexanoxy)silane.

A non-corrosive two package moisture curable organopolysiloxane composition free of carboxylic acid generating groups is shown by Nitzsche et al, U.S. Pat. No. 3,127,363 which is based on the use of a polyalkoxysilane, or polysilicate cross linking agent, in place of methyltriacetoxysilane. The ingredients of the two package noncorrosive composition of Nitzsche et al, are mixed under atmospheric conditions and the resulting composition must be used soon after the ingredients are mixed because the resulting blend has a short shelf life. Although the mixture of Nitzsche et al, which is typically polyalkoxysilane, silanol-terminated polydiorganosiloxane and tin soap catalyst, provides upon mixing, a fast curing non-corrosive room temperature vulcanizable composition, the Nitzsche et al mixture does not have the extended shelf life advantage of the one package system which is required for various commercial uses and therefore is excluded from a variety of applications.

Nitzsche et al, U.S. Pat. No. 3,065,194, teaches that a mixture of an endblocked dimethylsiloxane polymer, such as hydroxy and alkoxy endblocked, inert filler, ethylorthosilicate and dibutyltindilaurate can be vulcanized upon contact with water, after a 14 day shelf period at room temperature. However, the various ingredients of the mixture have to be vigorously dried by heating for 1 hour at 200° C., and the RTV, after a relatively short shelf period, has to be drenched with water.

Improved results toward combining the advantages of a non-corrosive acid-free polyalkoxysilane cross-linking agent with a silanol-terminated polydiorganosiloxane as a one-package system are shown by Weyenberg, U.S. Pat. No. 3,334,067, Cooper et al, U.S. Pat. No. 3,542,901 and by Smith et al U.S. Pat. Nos. 3,689,454, and 3,779,986, the last two being assigned to the same assignee as the present invention, utilizing a titanium chelate catalyst in place of a tin catalyst. However, after room temperature vulcanizable one-package systems based on a titanium chelate catalyst were allowed to age for a period of 5 hours or more, it was found that the tack-free time of the aged RTV was considerably longer than the tack-free time of the same mixture after it was initially mixed and immediately exposed to atmospheric moisture.

As shown by Brown et al U.S. Pat. No. 3,122,522, a platinum catalyst is used to prepare an alkoxy terminated silalkylenepolysiloxane polymer. However, this method of synthesizing the base polymer requires an expensive hydrosilylation procedure. Additional efforts to achieve a desirable non-corrosive, substantially odor-free stable one-package RTV based on the use of polyalkoxy organopolysiloxane in a more economic manner are shown by Brown et al, U.S. Pat. No. 3,161,614 or U.S. Pat. No. Re. 29,760. Brown et al employed a polyalkoxy end blocked polysiloxane which was based on the use of a mineral acid generating polyalkoxyhalosilane, and a curing catalyst. However, these compositions were found to be unusable because they failed to cure in contact with a tin catalyst, even in the presence of moisture.

As utilized hereinafter, the term "stable" as applied to the one package alkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

In copending application Ser. No. 277,524, now U.S. Pat. No. 4,395,526, filed June 26, 1981, White et al, for One Package, Stable, Moisture Curable, Polyalkoxy-terminated Organopolysiloxane Compositions and Method for Making, assigned to the same assigned as the present invention, room temperature vulcanizable compositions are shown based on the use of a polyalkoxy terminated polydiorganosiloxane and a silane scavenger for chemically combined hydroxy radicals. Additional room temperature vulcanizable organopolysiloxane compositions utilizing a silicon containing scavenger for chemically combined hydroxy radicals are shown by Dziark, copending application Ser. No. 349,695, now U.S. Pat. No. 4,417,042, filed Feb. 17, 1982, and Swiger et al, copending application Ser. No. 476,000, for Scavengers for One Component RTV Compositions, which are used in one package RTV applications.

In copending application Ser. No. 481,524, filed concurrently herewith, White et al for One Package, Stable, Moisture Curable, Polyalkoxy-terminated Organopolysiloxane Compositions and Method for Making, there is shown the employment of a silicon-free organic scavenger for chemically combined hydroxy radicals, which is also employed in combination with a polyalkoxy-terminated polydiorganosiloxane.

Experience has shown that room temperature vulcanizable compositions of Ser. No. 277,524, now U.S. Pat. No. 4,395,526, Ser. No. 349,695, now U.S. Pat. No. 4,417,042, Ser. No. 476,000, and Ser. No. 481,524 often require an amine accelerator to enhance the cure rate of the resulting room temperature vulcanizable composition when it is exposed to atmospheric moisture after an extended shelf period. It has been found that although the rate of cure of such compositions are substantially enhanced as a result of the use of such amine accelerators, the resulting curable mixtures and cured products obtained therefrom can be adversely affected. Those skilled in the art know, for example that amine accelerators often can result in room temperature vulcanizable compositions which can corrode metallic substrates when in contact thereto over an extended period of time. In addition, amine accelerators often have a disagreeable odor which can be imparted to the RTV composition.

The present invention is based on the discovery that stable, substantially acid-free, one-package moisture curable RTV compositions can be made having accelerated cure rates as compared to such RTV compositions free of cure accelerator, by substituting an effective amount of a diorganosulfoxide, such as dimethylsulfoxide for amine accelerator.

The alkoxy terminated polydiorganosiloxanes which can be employed in the room temperature vulcanizable compositions of the present invention in combination with the aforedescribed cure rate accelerators, silicon containing scavengers, organic scavengers, or mixtures thereof, are included within the formula,

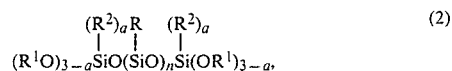

(2)

where R and n are as previously defined, $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and a is a whole number equal to 0 to 2 inclusive.

There also can be optionally used in the practice of the present invention, cross-linking polyalkoxysilane having the formula,

(3)

where $R^1$ and $R^2$ are as previously defined, and b is a whole number equal to 0 or 1.

The diorganosulfoxide cure rate accelerators used in the practice of the present invention also can provide certain RTV compositions having additional benefits as shown in my copending application Ser. No. 481,526, filed concurrently herewith. In instances where a stabilizer having enoxy functionality is used in the RTV composition, conventional amine accelerators such as dihexylamine have been found to produce an RTV composition which acquires an unacceptable yellow color upon heat aging or shelf aging over an extended period of time at ambient temperatures. Surprisingly, the diorganosulfoxide accelerators utilized in the practice of the present invention do not result in RTV compositions subject to a change in color upon heat aging as a result of the presence of scavengers having enoxy functionality.

STATEMENT OF THE INVENTION

There is provided by the present invention, a one-package, substantially anhydrous, room temperature vulcanizable organopolysiloxane composition stable under ambient conditions in the substantial absence of moisture over an extended period of time and convertible to a substantially acid-free, tack-free elastomer comprising by weight, (A) an organopolysiloxane wherein the silicon atom at each polymer chain end is terminated with at least one alkoxy radical, (B) an effective amount of condensation catalyst, (C) from 0 to 0.1 part, per part of the alkoxy terminated organopolysiloxane of (A) of a cross-linking polyalkoxysilane of formula
(D) 0.001 to 0.1 part, per part of the alkoxy terminated organopolysiloxane of a diorganosulfoxide curing accelerator having the formula,

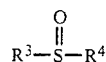

and
(E) a stabilizing amount of a scavenger for hydroxy-containing material in the organopolysiloxane RTV composition, selected from
  (i) an organic material having at least one alcohol reactive functional group which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I,
  (ii) a silicon containing scavenger having a molecular weight in the range of about 47 to about 5,000 and at least one chemically combined unit of the formula, $$\equiv Si(X)_c, \text{ and} \quad (5)$$

(iii) a zeolite where $R^3$ and $R^4$ are the same or different $C_{(1-13)}$ monovalent hydrocarbon radical or substituted monovalent hydrocarbon radical, X is a hydrolyzable leaving group selected from amido, amino, carbamato, enoxy, imidato, isocyanato, oximato, thioisocyanato and ureido radicals, c is a whole number equal to 0 to 4 inclusive, the remaining valences of Si other than those satisfied by X can be satisfied by one or more atoms selected from H, Si, C, O, N, P, S, transition elements IIIa, IVa, Va, VIa, VIIa and VIII and mixtures thereof.

Radicals included within R of formulas (1) and (2) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ of formula (2) are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals. In formulas (1–3), where R, $R^1$, and $R^2$, can be more than 1 radical, these radicals can be the same or different.

Included within the diorganosulfoxide of formula (4), there are dimethylsulfoxide, methylethylsulfoxide, diethylsulfoxide, dipropylsulfoxide, butylpropylsulfoxide, dibutylsulfoxide, diphenylsulfoxide, dibenzylsulfoxide; tetramethylenesulfoxide.

Some of the cross-linking polyalkoxysilanes included within formula (3) are, for example, methyltrimethoxysilane; methyltriethoxysilane; ethyltrimethoxysilane; tetraethoxysilane; vinyltrimethoxysilane; etc.

Some of the organic scavengers which can be used in the practice of the present invention are for example, ketenes such as dimethylketene, or diphenylketene; lactones, such as methylene butyrolactone, beta-butyrolactone, epsilon-caprolactone, 3-hydroxy-2,2,4-trimethyl-3-pentanoic acid-beta-lactone; vinyl ethers such as 4,5-dihydro-2-methylfuran, butylisopropenylether; carbodiimide derivatives such as cyclohexylcarbodiimide; isocyanates such as, phenylisocyanate, cyclohexylisocyanate, and toluene diisocyanate; and carboxylic acid anhydrides, for example, acetic anhydride, benzoic anhydride, etc.

Some of the silicon containing scavengers for chemically combined hydroxy radicals having at least one chemically combined unit included within formula (5), are for example,
Oximatosilanes such as,
  methyldimethoxy(ethylmethylketoximo)silane;
  methylmethoxybis-(ethylmethylketoximo)silane;
  methyldimethoxy(acetaldoximo)silane;
Carbamatosilanes such as,
  methyldimethoxy(N-methylcarbamato)silane;
  ethyldimethoxy(N-methylcarbamato)silane;
Enoxysilanes such as,
  methyldimethoxyisopropenoxysilane;
  trimethoxyisopropenoxysilane;
  methyltri-iso-propenoxysilane;
  methyldimethoxy(8but-2-ene-2-oxy)silane;
  methyldimethoxy(1-phenylethenoxy)silane;
  methyldimethoxy-2(1-carboethoxypropenoxy)silane;
Aminosilanes such as,
  methylmethoxydi-N-methylaminosilane;
  vinyldimethoxymethylaminosilane;
  tetra-N,N-diethylaminosilane;
  methyldimethoxymethylaminosilane;
  methyltricyclohexylaminosilane;
  methyldimethoxyethylaminosilane;
  dimethyldi-N,N-dimethylaminosilane;
  methyldimethoxyisopropylaminosilane;
  dimethyldi-N,N-diethylaminosilane.
Amidosilanes such as,
  ethyldimethoxy(N-ethylpropionamido)silane;
  methylmethoxydi(N-methylacetoamido)silane;
  methyldimethoxy(N-methylacetoamido)silane;
  methyltri(N-methylacetoamido)silane;
  ethyldimethoxy(N-methylacetoamido)silane;
  methyltri(N-methylbenzamido)silane;
  methylmethoxybis(N-methylacetoamido)silane;
  methyldimethoxy(caprolactamo)silane;
  trimethoxy(N-methylacetamide)silane.
Imidotosilanes such as,
  methyldimethoxyethylacetimidatosilane;
  methyldimethoxypropylacetimidatosilane.
Ureidosilanes such as,
  methyldimethoxy(N,N',N'-trimethylureido)silane;
  methyldimethoxy(N-allyl-N',N'-dimethylureido)silane;
  methyldimethoxy(N-phenyl-N',N'-dimethylureido)silane.
Isocyanatosilanes such as,
  methyldimethoxyisocyanatosilane;
  dimethoxydiisocyanatosilane.
Thioisocyanatosilanes such as,
  methyldimethoxythioisocyanatosilane;
  methylmethoxydithioisocyanatosilane.

Additional scavenging silanes are, for example, methyltris(N-methylacetamido)-silane; tetra(isopropenoxy)silane. Also included are silane having different leaving groups such as diethylamino(N-methylcarbamato)isopropenoxy(N-allyl-N',N'-dimethylureido)silane.

In addition to the above-described silanes having at least one silicon unit within the scope of formula (5), other silicon-nitrogen materials which can be used as scavengers in the practice of the present invention are, for example, silicon-nitrogen compounds selected from (i) a silicon-nitrogen compound having the formula,

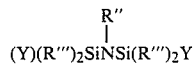

where Y is selected from R''' and R''$_2$N-and (ii) a silicon-nitrogen polymer comprising (1) from 3 to 100 mole percent chemically combined structured units selected from the class consisting of units having the formula

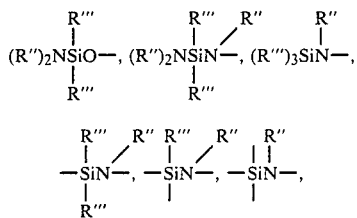

and (2) from 0 to 97 mole percent chemically combined structural units represented by the formula,

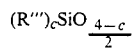

and mixtures thereof where the silicon atoms of said silicon-nitrogen polymer are joined to each other by a member selected from an SiOSi- linkage and a SiNR''Si linkage, the free valences of said silicon atoms other than those joined to oxygen to form a siloxy unit and nitrogen to form a silazy unit are joined to a member selected from an R'' radical and (R'')$_2$N radical, and where the ratio of the sum of said R''' radicals and said (R'')$_2$N radicals to the silicon atoms of said silicon-nitrogen polymer has a value of 15 to 3 inclusive, R'' is a member selected from the class consisting of hydrogen and C$_{(1-12)}$ monovalent hydrocarbon radicals, and fluoroalkyl radicals, R''' is a member selected from hydrogen, monovalent hydrocarbon radicals and fluoroalkyl radicals, and c is a whole number equal to 0 to 3 inclusive.

Some of the above silazanes which can be used in the practice of the present invention are, for example, hexamethylcyclotrisilazane, octamethylcyclotetrasiloxane, trimethyltriphenylcyclotrisilazane, trivinyltrimethylcyclotrisilazane, etc. Other silazanes within the scope of the above formulas are as follows:

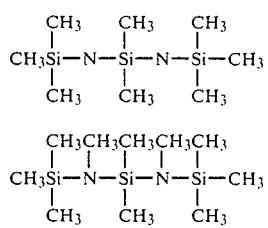

-continued

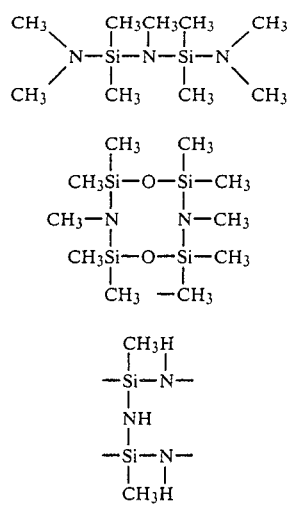

There can be phenyl, vinyl, 3,3,3-trifluoropropyl and various alkyl groups on middle Si atoms (ethyl, propyl, butyl).

The zeolite sieves which can be utilized in the practice of the present invention are more particularly shown in Reagents for Organic Synthesis, L. F. Fieser and M. Fieser, John Wiley, New York (1967), pages 703-705, Vol. 1. More particularly, molecular sieves are synthetic zeolites of completely regular crystal structure and uniform pore size. Typical molecular sieves which can be utilized are shown by types 3A, 4A, 5A and 13X which are available as powder, 1/16" pellets and ⅛" pellets, or in certain instances available in beads in three sizes. The following shows the compositions of some of these materials.

| Type | Formula | Nominal Pore Diameter |
|---|---|---|
| 3A | K$_9$Na$_3$[(AlO$_2$)$_{12}$(SiO$_2$)$_{12}$].27H$_2$O | 3A |
| 4A | Na$_{12}$[(AlO$_2$)$_{12}$(SiO$_2$)$_{12}$].27H$_2$O | 4A |
| 5A | Ca$_{4.5}$Na$_3$[(AlO$_2$)$_{12}$].30H$_2$O | 5A |
| 13X | Na$_{86}$[(AlO$_2$)$_{86}$(SiO$_2$)$_{106}$].xH$_2$O | 10A |

In addition to the above shown silane scavengers there are also included within the scope of the present invention silicon containing scavengers as shown in the aforementioned copending application Ser. No. 476,000 for Swiger et al, such as

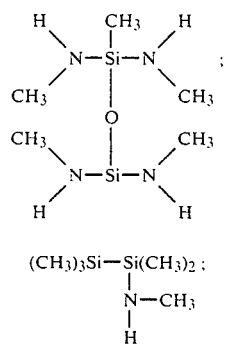

-continued

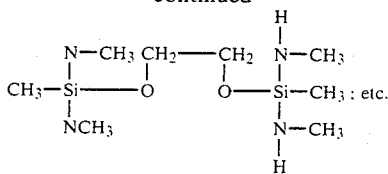

The alkoxy-terminated organopolysiloxane of formula (2), can be made by various procedures. One procedure is taught by Cooper et al U.S. Pat. No. 3,542,901 involving the use of a polyalkoxysilane with a silanol-terminated polydiorganosiloxane in the presence of an amine catalyst. For example, a cross-linking silane of formula (3) can be used in accordance with Cooper et al's method to end-cap a silanol-terminated polydiorganosiloxane of formula (1).

The silanol-terminated polydiorganosiloxanes which can be used to make the polyalkoxyorganopolysiloxanes are well known and preferably have a viscosity in the range of from about 100 to about 400,000 centipoise and more preferred from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1), are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

Preferably, the room temperature vulcanizable compositions can be made by agitating, for example stirring, a mixture of materials which can consist of the alkoxy-terminated polydiorganosiloxane, organic scavenger, silicon containing scavenger, zeolite, or mixture thereof, cross-linking silane of formula (4) which can be optional, diorganosulfoxide accelerator, where the blending is performed in the substantial absence of atmospheric moisture. Thereafter, the condensation catalyst can also be added in the substantial absence of atmospheric moisture.

As used hereinafter, the expressions "moisture-free conditions" and "substantially anhydrous conditions", with reference to making the RTV compositions of the present invention, mean mixing in a dry box, or in a closed container which has been subjected to vacuum or nitrogen purge to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions, a mixture of the polyalkoxy terminated organopolysiloxane, filler, along with an amount of scavenger for hydroxy radicals sufficient to effect the substantial elimination of hydroxy functional groups in the mixture. It has been found that a stabilizing amount scavenger for hydroxy radicals in accordance with the practice of the present invention means that there can be used from about 0.1 to about 10 parts of the scavenger 100 parts of the alkoxy-terminated polydiorganosiloxane or the silanol terminated polydiorganosiloxane. Preferably, 1 or 2 parts of scavenger per 100 parts of organopolysiloxane polymer can be used. There then can be added to the substantially silanol-free mixture, the condensation catalyst, cross-linking silane or mixture thereof, along with the diorganosulfoxide, pigments, etc.

In order that those skilled in the art will be better able to practice the invention, the following examples are given by way of illustration and not by way of limitation. All parts are by weight.

EXAMPLE 1

A room temperature vulcanizable composition was prepared by mixing together under substantially anhydrous conditions 100 parts of methyldimethoxy end-capped polydimethylsiloxane having a viscosity of $15-30 \times 10^3$ centipoise at 25° C., 0.2 part of dibutyltindiacetate, 1 part of dimethylsulfoxide and 2 parts of isopropenylacetate. The resulting polymer solutions were heat aged in glass vials in an oil bath within a drybox for a period of up to 48 hours at a temperature of 95° plus or minus 5° C. Tack-free times (TFT in minutes) were determined using 1-2 mm thick samples in a 58% humidity chamber. Additional polymer solutions were also prepared and evaluated in the same manner which were free of isopropenylacetate and/or dimethylsulfoxide. The following results were obtained, where "IPA" is isopropenyl acetate, "DMSO" is dimethylsulfoxide and "TFT" is tack-free time:

TABLE I

| Parts IPA | Parts DMSO | TFT (min) After Heat Aging (95° C.) | |
|---|---|---|---|
| | | 0 hr | 48 hr |
| 0 | 0 | 140 | No cure |
| 0 | 1 | 70 | No cure |
| 2 | 1 | 65 | 110 |

The above results show that dimethylsulfoxide is a valuable accelerator for stabilized RTV compositions.

EXAMPLE 2

Room temperature vulcanizable compositions were prepared in accordance with the procedure of Example 1, consisting of 63 parts of a methyldimethoxy terminated polydimethylsiloxane having a viscosity of 150–200,000 centipoise at 25° C., 37 parts of a polydimethylsiloxane fluid having a viscosity of about 50 centipoise at 25° C., 0.2 part of dibutyltindiacetate, 2 parts of methyldimethoxyisopropenoxysilane and from 0.2 to 0.8 part of an accelerator selected from dihexylamine, N-methylimidazole and dimethylsulfoxide.

The RTV compositions were then heat aged at 95°±5° C. over a period of up to 48 hours to determine tack-free times in minutes at thicknesses of about 2 mm. The following results were obtained:

TABLE II

| Accelerator | Parts | TFT (min) |
|---|---|---|
| dihexylamine | 0.6 | gelled |
| N—methylimidazole | 0.6 | 250 min |
| dimethylsulfoxide | 0.8 | 140 min |

The above results show that dimethylsulfoxide is a valuable accelerator for stabilized RTV compositions as compared to other accelerators.

EXAMPLE 3

Additional room temperature vulcanizable compositions were prepared consisting of 100 parts of a methyldimethoxy terminated polydimethylsiloxane having a viscosity of about $3.5 \times 10^3$ centipoise at 25° C., 0.2 part of dibutyltindiacetate, 1 part of dimethylsulfoxide and 2 parts of certain stabilizers. Additional compositions were also prepared free of stabilizer and free of dimethylsulfoxide.

The various compositions were then heat aged in accordance with the procedure of Example 1 at 95°±5° C., where substantially anhydrous conditions were maintained in the initial preparation of the room temperature vulcanizable compositions, as well as during the heat aging period. The following results were obtained where DMSO means dimethylsulfoxide and TFT is in minutes:

TABLE III

| Stabilizer | DMSO (parts) | TFT After Heat Aging at 95 ± 5° C. | |
|---|---|---|---|
| | | 0 hr | 48 hr |
| None | 0 | 108-155 | no cure |
| | 1 | ~70 | no cure |
| Beta-butyrolactone | 0 | 108-155 | 117 |
| | 1 | ~65 | 300 |
| Cyclohexylisocyanate | 0 | 108-155 | 75 |
| | 1 | ~55 | 55 |

The above results show that dimethylsulfoxide is a valuable accelerator and can be utilized with different stabilizers to effect an increase in the cure rate of a variety of room temperature vulcanizable compositions after an extended shelf period or equivalent accelerated heat age. A possible explanation for the increase in tack-free time with heat aged RTV composition containing the beta-butyrolactone scavenger is that a hydroxy ester is produced as a result of a reaction between by-product methanol and the beta-butyrolactone. In the presence of DMSO, this alcohol reaction by-product degrades the polymer, while in the absence of DMSO the degradation may not occur.

An additional cure rate study was made with a room temperature vulcanizable mixture consisting of 100 parts of the above methyldimethoxypolydimethylsiloxane 0.2 part of dibutyltindiacetate and 1 or 2 parts of dimethylsulfoxide under substantially anhydrous conditions. The following results were obtained:

TABLE IV

| DMSO (Parts) | TFT (min) |
|---|---|
| 0 | 105-140 |
| 1 | 49 |
| 2 | 30 |

The above results show that an increasing concentration of DMSO can accelerate the cure rate of a room temperature vulcanizable organopolysiloxane composition.

Although the above examples are directed to only a few of the very many variables which can be utilized in the practice of the present invention, it should be understood that the present invention is directed to a much broader variety of room temperature vulcanizable organopolysiloxane compositions utilizing a diorganosulfoxide as an accelerator in combination with an alkoxy functional organopolysiloxane polymer, a scavenger for hydroxy radicals and a condensation catalyst along with an alkoxy silane cross-linker. In instances where RTV compositions are made using silanol terminated polydiorganosiloxane, there can be used from 0.001 to 0.1 part of alkoxy silane cros-linker, per part of silanol polydiorganosiloxane.

What I claim as new and desire to secure by Letters Patent of the Unites States is:

1. A one-package, substantially anhydrous, room temperature vulcanizable organopolysiloxane composition stable under ambient conditions in the substantial absence of moisture over an extended period of time and convertible to a substantially acid-free, tack-free elastomer comprising by weight,
(A) an organopolysiloxane wherein the silicon atom at each polymer chain end is terminated with at least one alkoxy radical,
(B) an effective amount of condensation catalyst,
(C) from 0 to 0.1 part, per part of the alkoxy terminated organopolysiloxane of (A) of a cross-linking polyalkoxysilane of the formula,

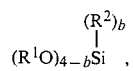

(D) 0.001 to 0.1 part, per part of the alkoxy terminated organopolysiloxane of a diorganosulfoxide curing accelerator having the formula,

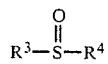

(E) a stabilizing amount of a scavenger for hydroxy-containing material in the organopolysiloxane RTV composition, selected from
(i) an organic material having at least one alcohol reactive functional groups which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I,
(ii) a silicon containing scavenger having a molecular weight in the range of about 47 to about 5,000 and at least one chemically combined unit of the formula, ≡Si—(X)$_c$, and (iii) a zeolite
where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals, $R^3$ and $R^4$ are the same or different $C_{(1-13)}$ monovalent hydrocarbon radical or substituted monovalent hydrocarbon radical, X is a hydrolyzable leaving group selected from amido, amino, carbamato, enoxy, imidato, isocyanato, oximato, thioisocyanato and ureido radicals, b is a whole number equal to 0 or 1, c is an integer equal to 0 to 4 inclusive and the remaining valences of Si other than those satisfied by X can be satisfied by atoms selected from Si, C, O, N, P, S, transition elements IIIa, IVa, Va, VIa, VIIa and VIII and mixtures thereof.

2. A composition in accordance with claim 1, where the organic scavenger is isopropenylacetate.

3. A composition in accordance with claim 1, where the silicon containing scavenger is methyldimethoxyisopropenylsilane.

4. A composition in accordance with claim 1, where the zeolite scavenger is a molecular sieve.

5. A composition in accordance with claim 1, where the silicon containing scavenger is a silazane.

6. A method for making a room temperature vulcanizable organopolysiloxane composition which comprises agitating under substantially anhydrous conditions at a temperature in the range of from 0° C. to 180° C. a mixture of ingredients comprising by weight
(A) a silanol terminated polydiorganosiloxane
(B) an effective amount of a condensation catalyst
(C) 0.001 to 0.1 part per part of the silanol terminated polydiorganosiloxane of a cross-linking polyalkoxysilane of the formula,

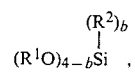

(D) 0.001 to 0.1 part, per part of the alkoxy terminated organopolysiloxane of a diorganosulfoxide curing accelerator having the formula,

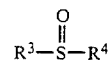

(E) a stabilizing amount of a scavenger for hydroxy-containing material in the organopolysiloxane RTV composition, selected from
(i) an organic material having at least one alcohol reactive functional groups which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I,
(ii) a silicon containing scavenger having a molecular weight in the range of about 47 to about 5,000 and at least one chemically combined unit of the formula, ≡Si—(X)$_c$, and (iii) a zeolite
where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals, $R^3$ and $R^4$ are the same or different $C_{(1-13)}$ monovalent hydrocarbon radical or substituted monovalent hydrocarbon radical, X is a hydrolyzable leaving group selected from amido, amino, carbamato, enoxy, imidato, isocyanato, oximato, thioisocyanato and ureido radicals, b is a whole number equal to 0 or 1, c is an integer equal to 0 to 4 inclusive and the remaining valences of Si other than those satisfied by X can be satisfied by atoms selected from Si, C, O, N, P, S, transition elements IIIa, IVa, Va, VIa, VIIa and VIII and mixtures thereof.

7. A method for making a room temperature vulcanizable composition which comprises agitating under substantially anhydrous conditions at a temperature in the range of from 0° C. to 180° C. a mixture of ingredients comprising by weight (A) an organopolysiloxane wherein the silicon atom at each polymer chain end is terminated with at least one alkoxy radical, (B) an effective amount of a condensation catalyst (C) 0 to 0.1 part per part of the alkoxy terminated organopolysiloxane of a cross-linking polyalkoxysilane of the formula,

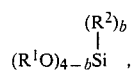

(D) 0.001 to 0.1 part, per part of the alkoxy terminated organopolysiloxane of a diorganosulfoxide curing accelerator having the formula,

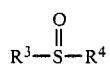

(E) a stabilizing amount of a scavenger for hydroxy-containing material in the organopolysiloxane RTV composition, selected from (i) an organic material having at least one alcohol reactive functional groups which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I, (ii) a silicon containing scavenger having a molecular weight in the range of about 47 to about 5,000 and at least one chemically combined unit of the formula,

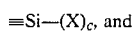

(iii) a zeolite where $R^1$ is a $C_{(1-8)}$ aliphatic organic radical selected from alkyl radicals, alkylether radicals, alkylester radicals, alkylketone radicals and alkylcyano or a $C_{(7-13)}$ radical, $R^2$ is a $C_{(1-13)}$ monovalent organic radical selected from R radicals, $R^3$ and $R^4$ are the same or different $C_{(1-13)}$ monovalent hydrocarbon radical or substituted monovalent hydrocarbon radical, X is a hydrolyzable leaving group selected from amido, amino, carbamato, enoxy, imidato, isocyanato, oximato, thioisocyanato and ureido radicals, b is a whole number equal to 0 or 1, c is an integer equal to 0 to 4 inclusive and the remaining valences of Si other than those satisfied by X can be satisfied by atoms selected from Si, C, O, N, P, S, transition elements IIIa, IVa, Va, VIa, VIIa and VIII and mixtures thereof.

* * * * *